(12) United States Patent
Collins

(10) Patent No.: US 8,253,397 B2
(45) Date of Patent: Aug. 28, 2012

(54) SWITCHING CONVERTERS WITH EFFICIENTLY-CONTROLLED MODE TRANSITIONS

(75) Inventor: Michael Collins, Firestone, CO (US)

(73) Assignee: Analog Devices, Inc., Norwood, MA (US)

( * ) Notice: Subject to any disclaimer, the term of this patent is extended or adjusted under 35 U.S.C. 154(b) by 514 days.

(21) Appl. No.: 12/487,468

(22) Filed: Jun. 18, 2009

(65) Prior Publication Data
US 2010/0320986 A1 Dec. 23, 2010

(51) Int. Cl.
*G05F 1/59* (2006.01)
(52) U.S. Cl. ......... 323/271; 323/283; 323/284; 323/286
(58) Field of Classification Search .................. 323/271, 323/283, 284, 285, 286
See application file for complete search history.

(56) References Cited

U.S. PATENT DOCUMENTS

| | | | | |
|---|---|---|---|---|
| 5,742,151 | A | 4/1998 | Hwang | 323/222 |
| 5,798,635 | A | 8/1998 | Hwang et al. | 323/222 |
| 6,348,779 | B1 | 2/2002 | Sluijs | 323/222 |
| 6,972,548 | B2 | 12/2005 | Tzeng et al. | 323/282 |
| 7,045,992 | B1 | 5/2006 | Silva et al. | 323/222 |
| 7,109,688 | B1 | 9/2006 | Chin et al. | 323/222 |
| 7,109,695 | B2 | 9/2006 | King | 323/283 |
| 7,230,408 | B1 | 6/2007 | Vinn et al. | 323/273 |
| 7,248,027 | B2 | 7/2007 | Ribeiro et al. | 323/282 |
| 7,358,711 | B2 | 4/2008 | Sutardja et al. | 323/283 |
| 7,382,114 | B2 | 6/2008 | Groom | 323/271 |
| 7,733,072 | B2 * | 6/2010 | Kanakubo | 323/271 |
| 7,843,186 | B2 * | 11/2010 | Nishida | 323/284 |
| 2010/0320986 | A1 * | 12/2010 | Collins | 323/284 |

OTHER PUBLICATIONS

Chen, Jingdong, "Determine Buck Converter Efficiency in PFM Mode", Power Electronics Technology, Sep. 2007, pp. 28-33.
"Optimizing Low Voltage Buck DC/DC Converter Efficiency", AN-107 Application Note, Analogic Technologies, Sunnyvale, California, 6 pages.
"An Efficiency Primer for Switch-Mode, DC-DC Converter Power Supplies", Application Note 4266, Dec. 2008 Maxim Integrated Products, Sunnyvale, California.

* cited by examiner

*Primary Examiner* — Jeffrey Sterrett
(74) *Attorney, Agent, or Firm* — Koppel, Patrick, Heybl & Philpott

(57) ABSTRACT

Efficiently controlled converter system embodiments are provided to operate in different operational modes. In a first operational PWM mode, first and second transistors are switched with a feedback-controlled duty cycle to thereby realize an inductor current that maintains a system output voltage. In a second operational PFM mode, after the output voltage decays to a lower threshold over a decay time, the control and synchronous transistors are driven a sufficient number of times to raise the output voltage to an upper threshold. The systems are controlled to efficiently transition between the first and second operational modes. For example, a converter system preferably transitions to the second PFM operational mode when current peaks of the inductor current drop below a predetermined current threshold and the system preferably transitions to the first PWM operational mode when the output voltage drops to a predetermined reference voltage.

13 Claims, 2 Drawing Sheets

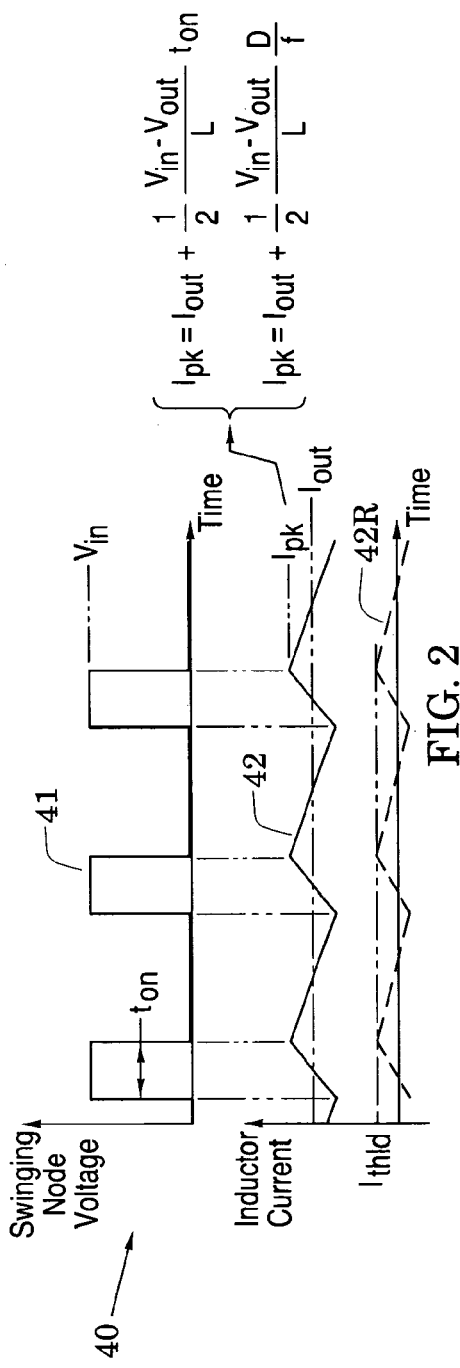
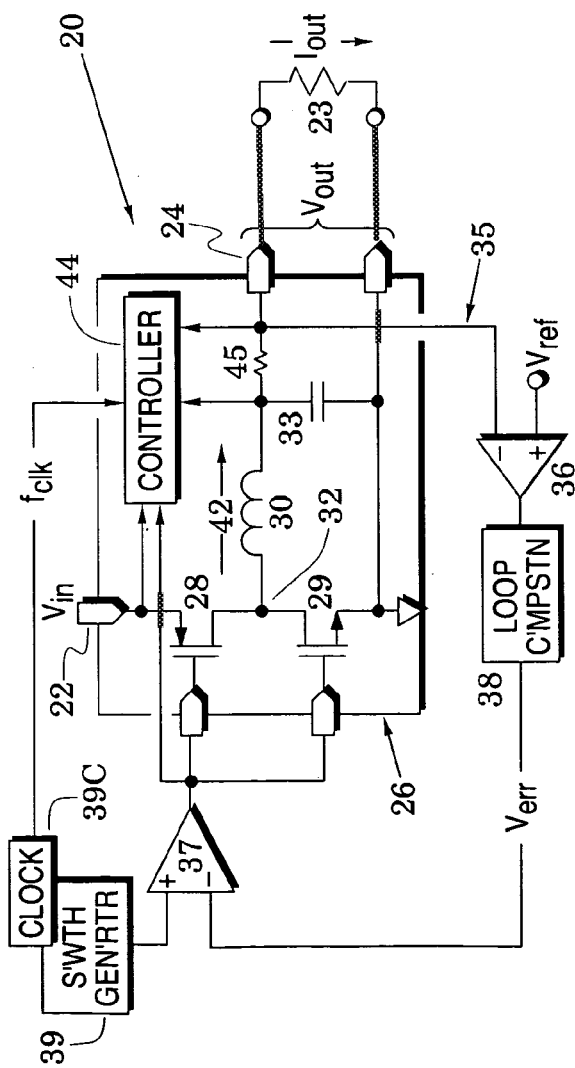
FIG. 1
FIG. 2

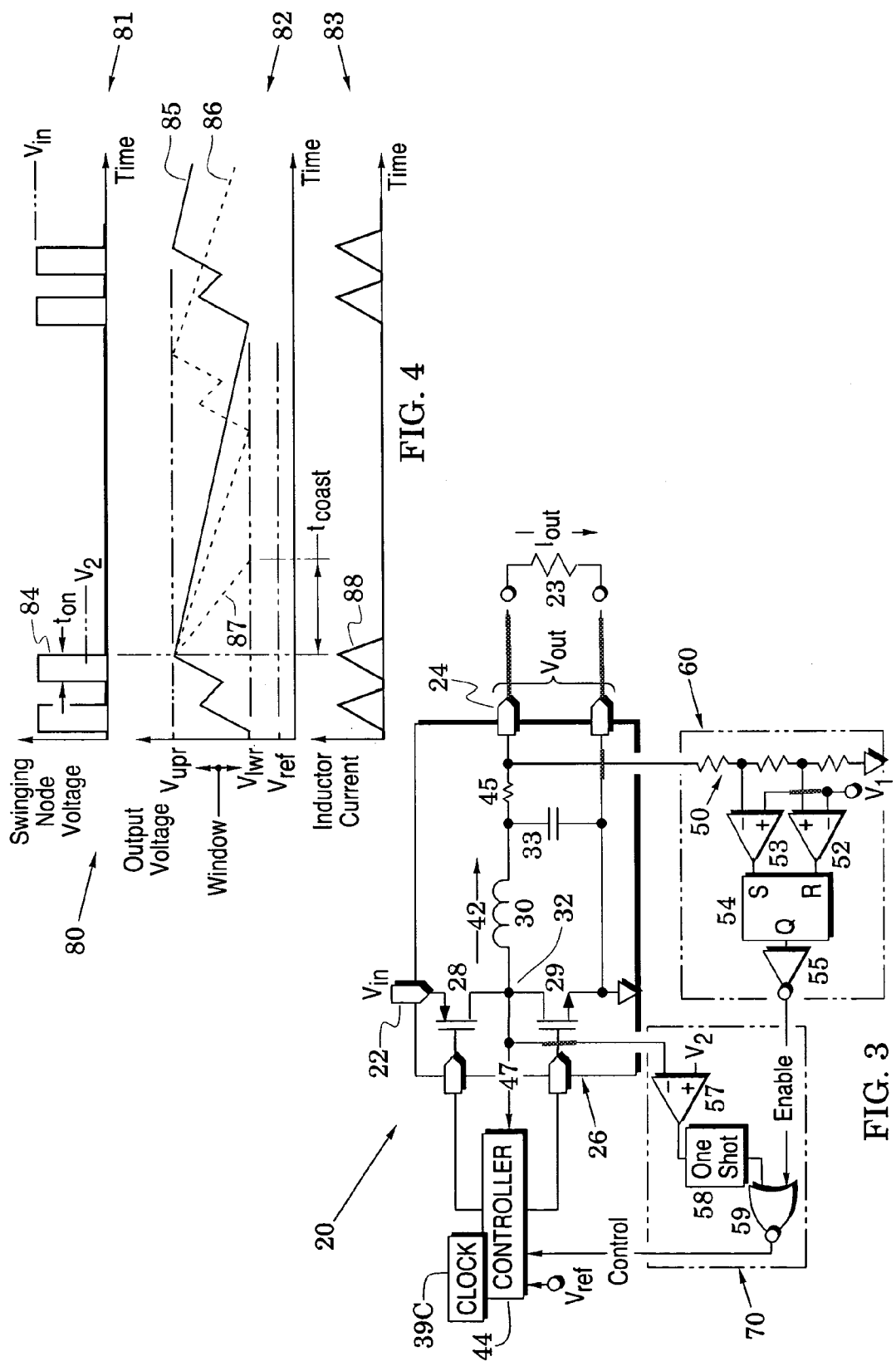

SWITCHING CONVERTERS WITH EFFICIENTLY-CONTROLLED MODE TRANSITIONS

BACKGROUND OF THE INVENTION

1. Field of the invention

The present invention relates generally to switching converters.

2. Description of the Related Art

Switched-mode power supplies (SMPS's) provide superior voltage conversion efficiency because they regulate an output voltage with transistor switches that are either on or off so that they never operate in the linear region in which both current and voltage are nonzero. Because at least one of transistor current and voltage is therefore always close to zero, dissipation is greatly reduced.

Because of their high efficiencies, SMPS's have been found to be particularly useful in a variety of portable devices (e.g., mobile phones, digital cameras, digital radios, portable disk drives and media players) that are powered by internal batteries (e.g., lithium batteries). Although other parameters are also important in these devices, operating efficiency is especially critical as it directly affects battery life. Typical high-efficiency SMPS's (e.g., step-down buck switching converters) are configured with an arrangement of an inductor, input and output capacitors, and control and synchronous switches. They may be provided in extremely small (e.g., 1.3×0.9×0.6 mm) configurations (e.g., chip scale packages).

Power losses in these configurations include conduction losses and switching losses. Conduction losses occur as switched currents pass through the inductor and capacitor and associated interconnecting traces. These losses can be limited by designing these components (e.g., with ceramic inductors and capacitors) to reduce parameters such as winding loss, core loss, dielectric loss and capacitor leakage. Another important contributor to the conduction losses is generated during each SMPS duty cycle as switch currents flow through the on-resistances of the switches which are typically realized with metal-oxide-semiconductor field effect transistors (MOSFET's). The control and synchronous transistors also contribute to the switching losses because they pass currents between sources and drains during finite transition periods in which they turn on and turn off. As SMPS's operate at higher clock rates, the switching losses become more important because the switching periods of the transistors reduces but the transition periods remain constant.

SMPS's are often designed to operate in a pulse-width modulation (PWM) mode in which the duty cycle of the control and synchronous transistors is varied to thereby control the SMPS output voltage. When operated with heavy loads (i.e., high output currents), well-designed SMPS obtain high efficiencies (e.g., greater than 90%) in the PWM mode. However, as the load reduces (i.e., output current decreases) the PWM mode efficiency rapidly drops because output conduction and switching losses remain constant as output power drops. Accordingly, SMPS's are often configured to include a pulse-frequency modulation (PFM) mode which is sometimes referred to as a pulse skipping mode. In this mode, conduction pulses have a constant width and are provided (e.g., singly or in bursts) as needed to maintain the output voltage within a voltage window. Although pulse skipping can maintain high efficiencies over a wide range of light loads, it typically fails to match the performance of the PWM mode (e.g., minimal output-voltage ripple and minimal frequency spurs).

BRIEF SUMMARY OF THE INVENTION

The present invention is generally directed to efficient switching converter systems. The drawings and the following description provide an enabling disclosure and the appended claims particularly point out and distinctly claim disclosed subject matter and equivalents thereof.

BRIEF DESCRIPTION OF THE DRAWINGS

FIG. 1 is a schematic of a switching converter system embodiment;

FIG. 2 is a diagram that illustrates currents and voltages in a first operational mode of the system of FIG. 1;

FIG. 3 is a schematic that illustrates additional elements of the converter system of FIG. 1; and FIG. 4 is a diagram that illustrates currents and voltages in a second operational mode of the system of FIGS. 1 and 3.

DETAILED DESCRIPTION OF THE INVENTION

FIGS. 1-4 illustrate efficiently controlled converter system embodiments that operate in different operational modes. In a first PWM operational mode, first and second transistors are switched with a feedback-controlled duty cycle D to thereby realize an inductor current that maintains a system output voltage $V_{out}$. In a second PFM operational mode, after the output voltage decays below a lower threshold over a decay time, the control and synchronous transistors are driven a sufficient number of times to raise the output voltage to an upper threshold.

The systems are controlled to efficiently transition between the first and second operational modes. For example, a converter system preferably transitions to the second PFM operational mode when current peaks of the inductor current drop below a predetermined current threshold and the system preferably transitions to the first PWM operational mode when the output voltage drops to a predetermined reference voltage.

In particular, FIG. 1 illustrates a switching converter system embodiment 20 that receives an input voltage $V_{in}$ at an input port 22 and, in response, generates a controlled output voltage $V_{out}$ across a load 23 at an output port 24 (wherein the load is symbolically indicated by a resistor). The system includes a buck converter 26 that is formed with control and synchronous transistors 28 and 29, an inductor 30, and a load capacitor 33. The sources of the control and synchronous transistors are respectively coupled to the input port 22 and to system ground. The capacitor is coupled across the output port and the inductor is coupled between the capacitor and the drains of the control and synchronous transistors to thereby form a swinging node 32.

A feedback loop 35 is formed with differential amplifier 36, comparator 37 and loop compensation 38. The differential amplifier 36 and the loop compensation 38 respond to the difference between the output voltage $V_{out}$ and a reference voltage $V_{ref}$ to thereby generate an error voltage $V_{err}$ which is applied to one input port of the comparator 37. Although the loop compensation 38 is shown as a single element following the differential amplifier 36, it may comprise in various embodiments, a variety of compensation elements (e.g., capacitors and resistors) that are arranged in various arrangements with the differential amplifier 36 to appropriately shape (e.g., with poles and zeros) the compensation response so that it stabilizes the feedback loop.

A sawtooth generator 39 provides a sawtooth waveform at a clock frequency $f_{clk}$ (e.g., 6 MHz) of a clock 39C to the other input port of the comparator 37. In response, the comparator provides gate signals to the control and synchronous transistors 28 and 29 to adjust their duty cycle in each period of the clock frequency $f_{clk}$ so as to reduce the error voltage $V_{err}$ and thereby control the output voltage $V_{out}$ to be substantially equal to the reference voltage $V_{ref}$.

As shown in the graph 40 of FIG. 2, the voltage 41 at the swinging node 32 is substantially $V_{in}$ when the output of the comparator 37 is low to thereby turn on the control transistor 28 and turn off the synchronous transistor 29. The voltage then drops to substantially equal system ground when the output of the comparator 37 is high to thereby turn off the control transistor and turn on the synchronous transistor. In each cycle of the clock frequency of the sawtooth generator 39, the ratio of the time that the control transistor is on to the time it is off defines the duty cycle D of the converter 26.

When the control transistor 28 is on in each operational cycle, the current 42 through the inductor 30 increases at a rate of $(V_{in}-V_{out})/L$ and when the synchronous transistor 29 is on in each operational cycle, it decreases at a rate of $V_{out}/L$ wherein L is the inductance of the inductor 30. Filtering action of the inductor 30 and the capacitor 33 produces the output current $I_{out}$ through the load 23. As shown in a plot of the inductor current 42 in FIG. 2, peaks of the inductor current are equally above and below the output current $I_{out}$ so that the peak current $I_{pk}$ in FIG. 2 (instantaneous current at the upper peaks of the inductor current) is given by, $$I_{pk} = I_{out} + \frac{1}{2}\frac{V_{in} - V_{out}}{L}t_{on} \qquad (1)$$

wherein $t_{on}$ is the time that the control transistor 28 is on in each cycle of the clock frequency $f_{clk}$. Because $t_{on}$ is given by $D/f_{clk}$, the peak current may also be expressed as, $$I_{pk} = I_{out} + \frac{1}{2}\frac{V_{in} - V_{out}}{L}\frac{D}{f_{clk}}. \qquad (2)$$

The output current $I_{out}$ of FIG. 2 substantially decreases when the converter system 20 of FIG. 1 is lightly loaded (i.e., when the impedance of the load 23 is high). It may even decrease to where the lower portions of the current 42 are negative. As the output current $I_{out}$ decreases, the power delivered to the output load 23 decreases but the switching losses associated with the control and synchronous transistors 28 and 29 remain relatively constant so that the efficiency of the converter system 20 significantly degrades. When the output current $I_{out}$ drops past some predetermined value, it is therefore desirable to transition the operation of the converter 20 from the pulse-width modulation (PWM) mode illustrated in FIGS. 1 and 2 to a pulse-frequency modulation (PFM) mode that will be more efficient with low output currents (i.e., light loads). In this way, efficiency will be enhanced by operating the converter system 20 in PWM mode with heavy loads and in PFM mode with light loads.

It is important, however, to reliably sense when an optimum transition point has been reached and it has been determined that some prior sensing methods are not reliable. For an example of a prior method, this transition might be made when the inductor current 42 in FIG. 2 has reduced to the point where the inductor current becomes negative during a portion of each operational cycle as illustrated by the exemplary inductor current 42R in FIG. 2. However, this sensing method has been found to be unreliable when the clock frequency $f_{clk}$ significantly increases (e.g., to several megahertz) and the values of the inductor 30 and capacitor 33 significantly reduce. It has been determined that the reliability further degrades when the input voltage $V_{in}$ varies over a wide input-voltage range (e.g., 2.1V to 5.5V).

In contrast, the converter 20 system of FIG. 1 is configured with a controller 44 that enables conversion to the PFM mode when the peak current $I_{pk}$ of the inductor current has reduced past a predetermined current threshold $I_{thld}$ that is shown in association with the reduced inductor current 42R in FIG. 2. This conversion method has been found to be a reliable indicator of the output current $I_{out}$ and to facilitate accurate design even as the input voltage varies and the converter operational frequency increases.

Accordingly, the controller 44 of FIG. 1 is arranged to receive operational parameters which may include the clock frequency $f_{clk}$, the input voltage $V_{in}$, the output voltage $V_{out}$, and the voltage 41 at the swinging node 32. In a controller embodiment, the controller 44 may also receive voltages across a small resistor 45 that is inserted prior to the output load 23 to thereby provide a reliable measure of the output current $I_{out}$. With these input parameters, the controller 44 is configured to calculate the peak current $I_{pk}$ in accordance with equation (2) and transition the converter 20 to its PFM mode when the peak current $I_{pk}$ drops below the predetermined current threshold $I_{thld}$ shown in FIG. 2.

As shown by the equation (2), the peak current $I_{pk}$ increases with increases in parameters such as the input voltage $V_{in}$ and the duty cycle D. By choosing the peak current $I_{pk}$ as the parameter to be compared to the current threshold $I_{thld}$, these parameter variations are automatically accommodated in the conversion to the PFM mode. It is noted that the inductor current 42R is reduced from the current 42 because the load has lightened, i.e., the load 23 has increased. Operation of the feedback loop 35 automatically reduces the duty cycle enough to obtain the lower current. Because the loop generally has a high gain, the reduction of the duty cycle is quite low so that the duty cycle of the inductor current 42R appears to match that of the current 42 in FIG. 2.

In an operational mode, the controller 44 is preferably configured to determine that the peak current $I_{pk}$ fails to reach the predetermined current threshold $I_{thld}$ over a predetermined time period (e.g., several clock cycles) before transitioning the converter 20 to the PFM mode. This added mode acts to prevent inadvertent cycling between operational modes.

FIG. 3 illustrates additional elements of the converter system 20 of FIG. 1 that are used when the controller 44 has caused the system to transition to the PFM mode of operation. The output voltage $V_{out}$ is now monitored with a resistor chain 50 that generates spaced-apart voltages in response to the output voltage $V_{out}$ at the output port 24. These spaced-apart voltages are compared to a threshold voltage $V_1$ in comparators 52 and 53 to provide inputs for an RS flip-flop 54 whose output goes to an inverter 55.

In FIG. 3, the resistor chain 50, the comparators 52 and 53, inverter 55 and flip-flop 54 are enclosed in a broken-line box to indicate that they form an embodiment of an output voltage $V_{out}$ window comparator 60 that provides an enable signal when the output voltage $V_{out}$ drops below a lower threshold voltage $V_{lwr}$ (see FIG. 4) and the flip-flop 54 is set. It continues to provide the enable signal until the output voltage $V_{out}$ rises above an upper threshold voltage $V_{upr}$ (see FIG. 4) and the flip-flop 54 is reset. At this point, the enable signal goes away and does not return until the output voltage $V_{out}$ again drops below the lower threshold voltage $V_{lwr}$.

Therefore, the enable signal is provided when the output voltage $V_{out}$ drops below the lower threshold voltage $V_{lwr}$ and continues to be provided until the output voltage $V_{out}$ rises above the upper threshold voltages $V_{upr}$. It is then absent until the output voltage $V_{out}$ drops below the lower threshold voltage $V_{lwr}$. It is recognized that FIG. 3 illustrates an embodiment of the output voltage $V_{out}$ window comparator and that this embodiment is just one of various equivalent window comparator embodiments which may be realized.

Another comparator 57 compares the voltage at the swinging node 32 to a threshold voltage $V_2$ that is elevated from system ground as shown in FIG. 4. The output of this comparator goes to a one shot multivibrator 58 that provides one input to a NOR gate 59. The enable signal of the window comparator 60 forms the other input of the NOR gate 59. The comparator 57, one shot 58 and NOR gate 59 are enclosed in a broken-line box to indicate that they form an embodiment of a control-signal generator 70 which is activated by the enable signal from the window comparator 60 and deactivated by the absence of the enable signal. It is recognized that FIG. 3 illustrates an embodiment of the control-signal generator 70 and that this embodiment is just one of various equivalent gate embodiments which may be realized.

The one shot 58 of the control-signal generator 70 is configured to flip from a first state to a second state when triggered and then stay in the second state for a predetermined time. The one shot 58 is triggered by the descending voltage at the swinging node 32. When this voltage passes the threshold voltage $V_2$, the one shot 58 is triggered so that its output voltage changes state for the time duration of the one shot. The output of the one shot forms the control signal that is provided to the controller 44 when the enable signal of the window comparator 60 is present. In absence of the enable signal, the control signal is not provided because it is blocked by the NOR gate 59.

Before describing FIG. 4, it is noted that FIG. 3 shows that the switching converter system 20 is configured so that the controller 44 can sense when the inductor current 42 has dropped substantially to ground. In a first embodiment, voltages across the small resistor 45 can be provided to the controller 44 so that it receives a reliable measure of the output current $I_{out}$. In another embodiment, the controller 44 can monitor the voltage of the swinging node 32 (e.g., with a sense line 47) and compare this voltage to ground. The sense line 47 essentially enables the controller 44 to form a zero-current detector. Yet other embodiments can be used to provide the controller 44 with knowledge of when the inductor current 42 has reached substantially zero.

FIG. 4 is a graph 80 that illustrates processes in the converter system of FIG. 3 during the PFM operational mode. The graph has a first portion 81 which shows voltages at the swinging node 32 of FIG. 3 and has a second portion 82 which shows the output voltage at the output port 24 of FIG. 3. A third portion 83 of the graph 80 of FIG. 4 illustrates the inductor current 42 (shown in FIG. 3) through the inductor 30. The voltage of the swinging node 32 is substantially $V_{in}$ when the control transistor 28 is on and is substantially ground when the synchronous transistor 29 is on. The output voltage generally moves between the lower and upper threshold voltages $V_{lwr}$ and $V_{upr}$ and the inductor current ramps up and down in respective response to the control and synchronous transistors (28 and 29 in FIG. 3).

It is now assumed that the controller 44 has determined that the peak current $I_{pk}$ of FIG. 2 fails to reach the predetermined current threshold $I_{thld}$ over a predetermined time period and has thus transitioned the converter 20 to the PFM mode. It is further assumed that the output voltage $V_{out}$ has dropped below the lower threshold voltage $V_{lwr}$ so that the enable signal is provided to the control-signal generator 70 by the window comparator 60. The NOR gate 59 thus only responds to the one shot 58 and the control signal is only determined by the one shot.

As long as the enable signal is present, the action of the control and synchronous transistors 28 and 29 is determined by the control-signal generator 70 and its control signal to the controller 44. When the inductor current reaches a sufficiently-high value, the voltage at the swinging node 32 drops below the threshold voltage $V_2$, which causes the comparator 57 to trigger the one shot 58 so that its output voltage changes state for the time duration of the one shot. This changed state of the control signal tells the controller 44 to turn off the control transistor 28 and turn on the synchronous transistor 29. This causes the inductor current to decay to zero (as sensed by either the small resistor 45 or the sense line 47) as shown in the plot 88 of the graph 83 of FIG. 4.

In response to the zero current, the controller 44 turns off the synchronous transistor 29. The time duration of the one shot 58 is set so that a short time later the control signal changes back to its first state. In response, the controller 44 turns on the control transistor 28 again and the above-described cycle repeats. In that repeat, the inductor current rises as shown in the plot 88 of the graph 83 of FIG. 4. Because of the extended time duration of the one shot 58, there will be a short delay between the time the synchronous transistor 29 turns off and the control transistor 28 turns on. This is evident in the inductor current 88 of graph 83.

As shown in the graph 82 of FIG. 4, this action causes the output voltage $V_{out}$ to move upward until it crosses the upper threshold voltage $V_{upr}$. This resets the flip-flop 54 of FIG. 3 so that the window comparator 60 no longer provides the enable signal to the control-signal generator 70 and, accordingly, the control and synchronous transistors 28 and 29 are shut off. The controller 44 is preferably configured so that, if the control transistor 28 is on at this time, the controller will turn it off and turn on the synchronous transistor 29 long enough to drop the inductor current to zero. The controller 44 is also preferably configured so that, if the synchronous transistor 29 is on at this time, the controller 44 will turn it off after the inductor current has decayed to zero.

This PFM process is highly efficient because the control and synchronous transistors only pulse momentarily as shown in FIG. 4 to bring the output voltage up to the upper threshold voltage $V_{upr}$ and then the output voltage is allowed to slowly decay to the lower threshold voltage $V_{lwr}$. During the time the output voltage $V_{out}$ is decreasing from the upper threshold voltage $V_{upr}$ to the lower threshold voltage $V_{lwr}$, the controller 44 can be configured so that all non-essential circuitry is turned off to conserve power. This slow decay is determined by the loading at the output port 24. A similar broken-line plot 86 indicates the output voltage when this loading has further increased. As the load on the system continues to increase, the decay will proceed more rapidly as indicated by the broken-line segment 87 in the graph portion 82 of FIG. 4. The time for the output voltage $V_{out}$ to decay to the lower threshold voltage $V_{lwr}$ may be defined as a coast time $t_{coast}$ as shown in the graph 82 of FIG. 4.

When the load has increased so that the coast time $t_{coast}$ substantially equals the time duration of the one shot 58 of FIG. 3, the output current $I_{out}$ across the output load 23 substantially equals the current that the switching converter system 20 can supply in the PFM mode. The system will no longer be able to drive the output current to the upper threshold voltage $V_{upr}$ of the graph 82 of FIG. 4 and, accordingly, the system will continuously cycle the above-described process of alternately turning on the control and synchronous transistors 28 and 29 of FIG. 3.

When the load further increases, the output voltage will drop below the reference voltage $V_{ref}$ (introduced with the comparator 36 in FIG. 1 and shown in the graph 82 of FIG. 4). This latter action causes the controller 44 to convert the switching converter system 20 back to the PWM mode that was illustrated in FIGS. 1 and 2. As shown in the graph portion 82 of FIG. 4, the reference voltage $V_{ref}$ is sufficiently spaced from the lower threshold voltage $V_{lwr}$ to insure that the converter system 20 does not begin to oscillate back and forth between the PWM and PFM operational modes.

To enhance control of when the system 20 transitions from the PFM mode to the PWM mode, the time duration of the one shot 58 of FIG. 3 may be adjusted (e.g., by the controller 44) as a function of the input and output voltages $V_{in}$ and $V_{out}$ to thereby make the transition more consistent. In a system embodiment, the peak inductor current can be controlled to be a function of the input and output voltages $V_{in}$ and $V_{out}$ so that the average inductor current at the time of transfer to the PWM mode is substantially constant over variations in the input and output voltages $V_{in}$ and $V_{out}$. In another system embodiment, the control-signal generator 70 can be eliminated and the control and synchronous transistors 28 and 29 controlled to obtain an inductor current that moves between a desired peak current and zero. The peak current can be altered as a function of the input and output voltages $V_{in}$ and $V_{out}$ so that the transition to the PWM mode is substantially constant over variations in the input and output voltages $V_{in}$ and $V_{out}$.

It is noted that the controller 44 can be realized with a variety of conventional structures such as arrays of gates and/or appropriately-programmed digital processors.

The embodiments of the invention described herein are exemplary and numerous modifications, variations and rearrangements can be readily envisioned to achieve substantially equivalent results, all of which are intended to be embraced within the spirit and scope of the appended claims.

I claim:

1. A method to enhance efficiency in a switching converter system, comprising:
    in a first operational mode, alternately switching first and second transistors with a feedback-controlled duty cycle D to thereby realize an inductor current that maintains an output voltage $V_{out}$;
    in a second operational mode, after said output voltage decays to a lower threshold over a decay time, alternately switching said first and second transistors a sufficient number of times to raise said output voltage to an upper threshold;
    transitioning to said second operational mode when current peaks of said inductor current drop below a predetermined current threshold; and
    transitioning to said first operational mode when said output voltage drops to a predetermined reference voltage;
    wherein said transitioning to said first operational mode step includes the steps of:
    providing an enable signal when said output voltage drops below said lower threshold and removing said enable signal when said output voltage rises above said upper threshold; and
    generating, in response to said enable signal, a control signal having a first state to signal said controller to turn on said first transistor and a succeeding second state to signal said controller to turn on said second transistor.

2. The method of claim 1, wherein said first and second transistors define a swinging node therebetween and said generating step includes the step of providing said first and second states of said control signal in response to a voltage at said swinging node.

3. A switching converter system with enhanced efficiency, comprising:
    a switching converter configured to:
        in a first operational mode, alternately switch on first and second transistors with a feedback-controlled duty cycle D to thereby realize an inductor current that maintains an output voltage $V_{out}$;
        in a second operational mode, after said output voltage decays to a lower threshold over a decay time, alternately switch said first and second transistors a sufficient number of times to raise said output voltage to an upper threshold; and
    a controller arranged to:
        transition said converter to said second operational mode when current peaks of said inductor current drop below a predetermined current threshold; and
        transition said converter to said first operational mode when said output voltage drops to a predetermined reference voltage;
    wherein said converter includes:
        a capacitor to hold said output voltage;
        an inductor coupled between said capacitor and a swinging node between said first and second transistors to thereby carry said inductor current; and
        a feedback loop configured to adjust said duty cycle in response to a difference between said output voltage and said reference voltage; and
    wherein said controller is configured to:
        store an inductance L of said inductor and an input voltage $V_{in}$ coupled to said first transistor;
        switch said first and second transistors at a switching frequency f;
        determine an average output current $I_{out}$ through said inductor; and
        determine said current peaks as $I_{out}+\frac{1}{2}((V_{in}-V_{out})/L)(D/f)$.

4. A switching converter system with enhanced efficiency, comprising:
    a switching converter configured to:
        in a first operational mode, alternately switch on first and second transistors with a feedback-controlled duty cycle D to thereby realize an inductor current that maintains an output voltage $V_{out}$;
        in a second operational mode, after said output voltage decays to a lower threshold over a decay time, alternately switch said first and second transistors a sufficient number of times to raise said output voltage to an upper threshold;
    a controller arranged to:
        transition said converter to said second operational mode when current peaks of said inductor current drop below a predetermined current threshold;
        transition said converter to said first operational mode when said output voltage drops to a predetermined reference voltage;
    a window comparator arranged to provide an enable signal when said output voltage drops below said lower threshold and remove said enable signal when said output voltage rises above said upper threshold; and
    a control-signal generator configured to generate, in response to said enable signal, a control signal having a first state to signal said controller to turn on said first transistor and a succeeding second state to signal said controller to turn on said second transistor.

5. The system of claim 4, wherein said first and second transistors define a swinging node therebetween and said control-signal generator includes a multivibrator to provide said first and second states of said control signal in response to a voltage at said swinging node.

6. The system of claim 4, wherein said control-signal generator includes a comparator arranged to signal said multivibrator of said voltage at said swinging node.

7. The system of claim 4, wherein said converter includes:
a capacitor to hold said output voltage;
an inductor coupled between said capacitor and a swinging node between said first and second transistors to thereby carry said inductor current; and
a feedback loop configured to adjust said duty cycle in response to a difference between said output voltage and said reference voltage.

8. A method to enhance efficiency in a switching converter system, comprising:
in a first operational mode, alternately switching first and second transistors with a feedback-controlled duty cycle D to thereby realize an inductor current that maintains an output voltage $V_{out}$;
in a second operational mode, after said output voltage decays to a lower threshold over a decay time, alternately switching said first and second transistors a sufficient number of times to raise said output voltage to an upper threshold;
transitioning to said second operational mode when current peaks of said inductor current drop below a predetermined current threshold; and
transitioning to said first operational mode when said output voltage drops to a predetermined reference voltage;
wherein:
said switching is at a rate f;
said first transistor receives an input voltage $V_{in}$; and
said inductor current passes through an inductance L and across an output capacitor to generate an output current $I_{out}$; and
further including the step of:
determining said current peaks as $I_{out}+½((V_{in}-V_{out})/L)(D/f)$.

9. A method to enhance efficiency in a switching converter system, comprising:
in a first operational mode, alternately switching first and second transistors with a feedback-controlled duty cycle D to thereby realize an inductor current that maintains an output voltage $V_{out}$;
in a second operational mode, after said output voltage decays to a lower threshold over a decay time, alternately switching said first and second transistors a sufficient number of times to raise said output voltage to an upper threshold;
transitioning to said second operational mode when current peaks of said inductor current drop below a predetermined current threshold; and
transitioning to said first operational mode when said output voltage drops to a predetermined reference voltage;
wherein said transitioning to said second operational mode step includes the step of affirming that said current peaks fail to reach said predetermined current threshold over a predetermined time duration.

10. A switching converter system to drive a load with enhanced efficiency from an input voltage $V_{in}$, the system comprising:
a buck converter having first and second transistors, an output capacitor, and an inductor of inductance L coupled between said transistors and said capacitor;
a feedback loop configured to control, in a first operational mode, a duty cycle D of said first and second transistors as they switch at a frequency f to thereby realize an inductor current that maintains an output voltage $V_{out}$ across said capacitor and an output current $I_{out}$ through said load; and
a controller arranged to:
transition said converter to a second operational mode when current peaks of said inductor current drop below a predetermined current threshold;
after said output voltage decays in said second operational mode below a lower threshold over a decay time, drive said first and second transistors a sufficient number of times to raise said output voltage to an upper threshold; and
transition said converter to said first operational mode when said output voltage drops to a predetermined reference voltage;
wherein said controller is configured to:
determine an average output current $I_{out}$ through said inductor; and
determine said current peaks as $I_{out}+½((V_{in}-V_{out})/L)(D/f)$.

11. A switching converter system to drive a load with enhanced efficiency from an input voltage $V_{in}$, the system comprising:
a buck converter having first and second transistors, an output capacitor, and an inductor of inductance L coupled between said transistors and said capacitor;
a feedback loop configured to control, in a first operational mode, a duty cycle D of said first and second transistors as they switch at a frequency f to thereby realize an inductor current that maintains an output voltage $V_{out}$ across said capacitor and an output current $I_{out}$ through said load;
a controller arranged to:
transition said converter to a second operational mode when current peaks of said inductor current drop below a predetermined current threshold;
after said output voltage decays in said second operational mode below a lower threshold over a decay time, drive said first and second transistors a sufficient number of times to raise said output voltage to an upper threshold; and
transition said converter to said first operational mode when said output voltage drops to a predetermined reference voltage;
a window comparator arranged to provide an enable signal when said output voltage drops below said lower threshold and remove said enable signal when said output voltage rises above said upper threshold; and
a control-signal generator configured to generate, in response to said enable signal, a control signal having a first state to signal said controller to turn on said first transistor and a succeeding second state to signal said controller to turn on said second transistor.

12. The system of claim 11, wherein said first and second transistors define a swinging node therebetween and said control-signal generator includes a multivibrator to provide said first and second states of said control signal in response to a voltage at said swinging node.

13. The system of claim 11, wherein said control-signal generator includes a comparator arranged to signal said multivibrator of said voltage at said swinging node.

* * * * *

UNITED STATES PATENT AND TRADEMARK OFFICE
CERTIFICATE OF CORRECTION

PATENT NO.         : 8,253,397 B2
APPLICATION NO.    : 12/487468
DATED              : August 28, 2012
INVENTOR(S)        : Michael Collins Page 1 of 1

It is certified that error appears in the above-identified patent and that said Letters Patent is hereby corrected as shown below:

Column 7, Claim 1, Line 9, after "alternately switching said" please delete "first and second" and add --control and synchronous--

Column 9, Claim 8, Line 9, after "alternately switching said" please delete "first and second" and add --control and synchronous--

Signed and Sealed this
Sixth Day of November, 2012

David J. Kappos
*Director of the United States Patent and Trademark Office*

UNITED STATES PATENT AND TRADEMARK OFFICE
CERTIFICATE OF CORRECTION

PATENT NO. : 8,253,397 B2  
APPLICATION NO. : 12/487468  
DATED : August 28, 2012  
INVENTOR(S) : Michael Collins Page 1 of 1

It is certified that error appears in the above-identified patent and that said Letters Patent is hereby corrected as shown below:

Column 7, line 48 (Claim 1, Line 9) after "alternately switching said" please delete "first and second" and add --control and synchronous--

Column 9, line 25 (Claim 8, Line 9) after "alternately switching said" please delete "first and second" and add --control and synchronous--

This certificate supersedes the Certificate of Correction issued November 6, 2012.

Signed and Sealed this
Eleventh Day of December, 2012

David J. Kappos
*Director of the United States Patent and Trademark Office*